United States Patent
Tadele et al.

(10) Patent No.: US 8,490,480 B2
(45) Date of Patent: Jul. 23, 2013

(54) DEVICE FOR MONITORING TIRE PRESSURE

(75) Inventors: Sisay Tadele, Leonberg (DE); Andreas Nagora, Walzbachtal (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 73 days.

(21) Appl. No.: 13/286,927

(22) Filed: Nov. 1, 2011

(65) Prior Publication Data

US 2012/0111102 A1    May 10, 2012

(30) Foreign Application Priority Data

Nov. 3, 2010   (DE) .......................... 10 2010 050 365

(51) Int. Cl.
*B60C 23/02*   (2006.01)

(52) U.S. Cl.
USPC ....................................................... 73/146.5

(58) Field of Classification Search
USPC ............................... 73/146–146.8
See application file for complete search history.

(56) References Cited

U.S. PATENT DOCUMENTS

| | | | |
|---|---|---|---|
| 5,717,135 A * | 2/1998 | Fiorletta et al. .............. | 73/146.5 |
| 5,844,131 A | 12/1998 | Gabelmann et al. | |
| 6,005,480 A | 12/1999 | Banzhof et al. | |
| 6,101,870 A * | 8/2000 | Kato et al. .................... | 73/146.8 |
| 6,580,363 B1 | 6/2003 | Wilson | |
| 6,591,672 B2 | 7/2003 | Chuang et al. | |
| 6,825,759 B2 * | 11/2004 | Yamagiwa et al. ........... | 340/445 |
| 7,458,256 B1 | 12/2008 | Lin | |
| 7,764,168 B1 | 7/2010 | Huang | |
| 7,775,115 B2 | 8/2010 | Theuss et al. | |
| 8,248,225 B2 * | 8/2012 | Buck et al. .................... | 340/447 |
| 2003/0000297 A1 * | 1/2003 | Ito et al. ......................... | 73/146 |
| 2009/0261962 A1 | 10/2009 | Buck et al. | |

FOREIGN PATENT DOCUMENTS

JP        2003-165315 A       6/2003

\* cited by examiner

*Primary Examiner* — Andre Allen

(57) ABSTRACT

A device for monitoring tire pressure includes an antenna for transmitting pressure data, a printed circuit board with a circuit for measuring and transmitting pressure data that is connected to the antenna, a power source for supplying the circuit, and a housing surrounding the printed circuit board, According to the invention, the housing is produced by insert-molding the antenna.

10 Claims, 3 Drawing Sheets

DEVICE FOR MONITORING TIRE PRESSURE

The invention generally relates to a device for monitoring tire pressure. A device of this type is known from DE 196 24 800 A1, for example.

The known device comprises a printed circuit board, which carries an antenna and a circuit for measuring and transmitting pressure data. A sensor for pressure measurement is part of this circuit. In the known device, the printed circuit board is disposed in a plastic housing filled with a potting compound.

It is an object of the present invention to show a way of how the manufacture of a device for monitoring the tire pressure can be simplified.

SUMMARY OF THE INVENTION

In a device according to the invention, the antenna is integrated in the housing of the device. The housing is molded around the antenna so as to produce a device according to the invention. The antenna is thus embedded in the wall of the housing.

By integrating the antenna in the housing, the size of the device on an overall basis can advantageously be reduced. A further advantage is that connections of the antenna protruding from a housing wall can be designed as press-fit pins and a printed circuit board having an antenna circuit can thus be mounted with advantageously little effort in the housing by means of a pressing technique.

According to an advantageous refinement of the invention, a power source for supplying the electric circuit carried by the printed circuit board and the printed circuit board are disposed on top of one another. This means that an upper face or a lower face of the printed circuit board faces the power source. The power source is preferably a battery, still more preferably a button cell. The power source is preferably disposed on the side of the printed circuit board facing away from the antenna.

By disposing the power source, preferably a button cell, and the printed circuit board on top of one another, production can be considerably simplified. These components can be placed into the housing consecutively or as a sub-assembled package and then be secured therein, in particular by snap-fitting. The power source and printed circuit board can be disposed on top of one another regardless of whether the antenna is integrated in the housing, and the related advantages can be utilized. One aspect of the present invention thus also relates to a device for monitoring the tire pressure, comprising an antenna for transmitting pressure data, a printed circuit board, which carries a circuit for measuring and transmitting pressure data that is connected to the antenna, a power source for supplying the circuit, and a housing surrounding the printed circuit board, wherein the printed circuit board and the power source are disposed on top of one another.

According to a further advantageous refinement of the invention, the housing comprises undercut detent elements for snap-fitting, which grip the power source. In this way, production can be simplified further. The power source, preferably a button cell, only has to be pressed into the housing and is then held in place by the detent elements.

BRIEF DESCRIPTION OF THE DRAWINGS

Further details and advantages of the invention will be described based on embodiments with reference to the attached drawings. Identical and corresponding parts are denoted with agreeing reference numerals in the drawings.

DETAILED DESCRIPTION

Figure 1:
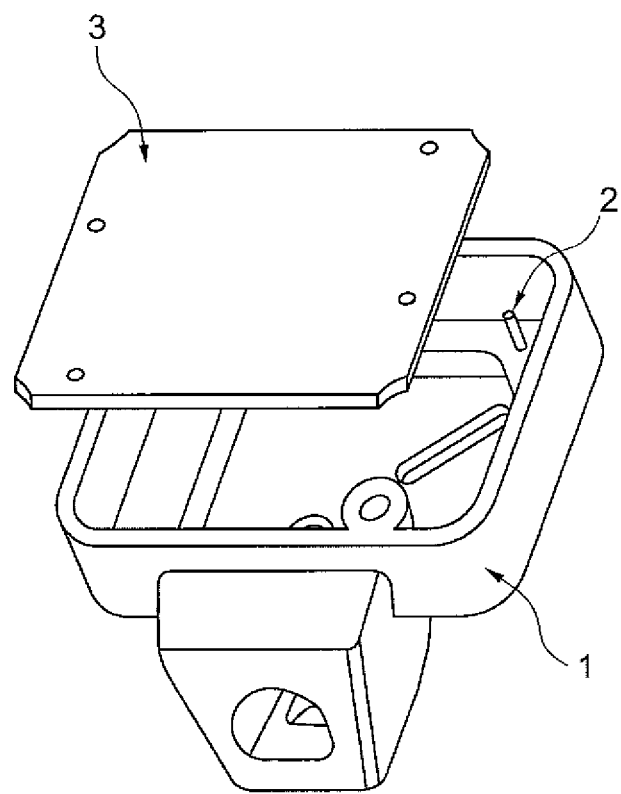
FIG. 1: is the housing of a device for monitoring the tire pressure and a printed circuit board.

FIG. 1 shows the housing 1 of a device for monitoring the tire pressure. The housing 1 is produced from plastic material by insert-molding of an antenna. The antenna is a magnetic antenna, for example a metal bracket, and comprises two press-fit pins 2 protruding from a housing wall. in FIG. 1, one of the two press-fit pins 2 is hidden behind a printed circuit board 3, which is inserted in the housing. The press-fit pins 2 are pressed into metallized holes of the printed circuit board 3, so that the antenna is connected by means of a pressing technique to the circuit for measuring and transmitting pressure data which is carried by the printed circuit board. The circuit carried by the printed circuit board 3 contains a sensor for pressure measurement.

Figure 2:
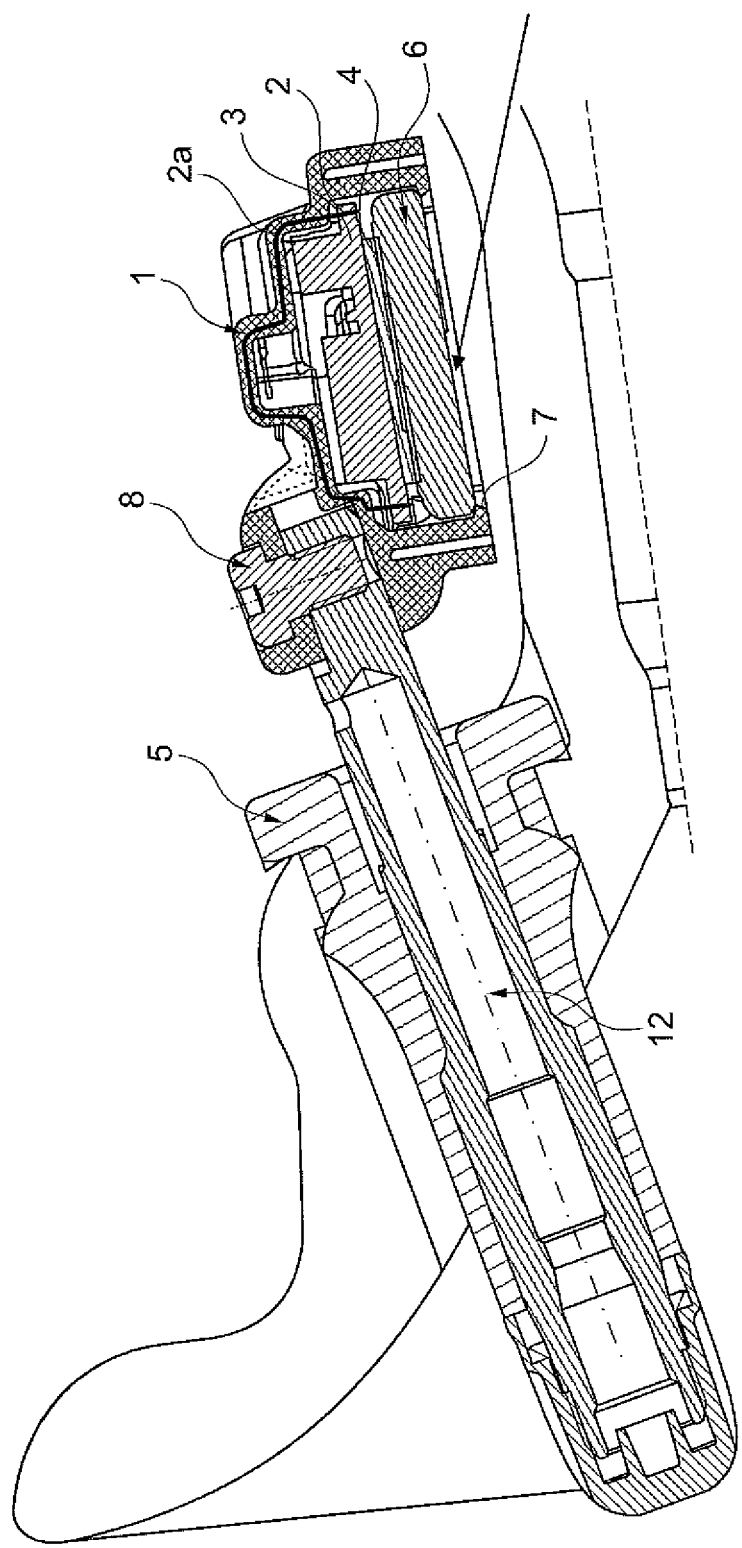
FIG. 2: is a sectional view of the device comprising a tire valve.

FIG. 2 shows a sectional view of the entire device for monitoring the tire pressure after assembly to a tire valve 5, wherein the antenna 2a is schematically indicated in the housing 1. After the printed circuit board 3 has been inserted in the plastic housing 1, an electrically insulating spacer plate 4, for example made of plastic or ceramic material, is placed on the printed circuit board 3. A battery 6 is located on the spacer plate 4 and serves as the power source.

The battery 6 is held in the housing 1 by detent element 7. For this purpose, the housing 1 comprises undercut detent elements 7, which grip the battery 6. On the side facing away from the battery 6, the detent elements 7 have an insertion taper, which adjoins an undercut. After the battery 6 is inserted, remaining cavities in the housing 1 can be filled in with potting compound. In the finished device, the printed circuit board 3 is thus embedded in the potting compound, so that the device can withstand the acceleration forces occurring on a vehicle tire.

As is shown in FIG. 2, the housing 1 comprises a channel, by which it is placed onto the tire valve 5. The placement direction agrees with the longitudinal direction of the valve 5, and thus with the direction of the flow channel 12 through which air can flow through the valve. A securing element 8 engages with the valve 5 transversely to the placement direction. In the embodiment shown, the securing element 8 is a screw. The valve housing 1 has an opening for the securing element, this opening leading to the channel.

Figure 3:
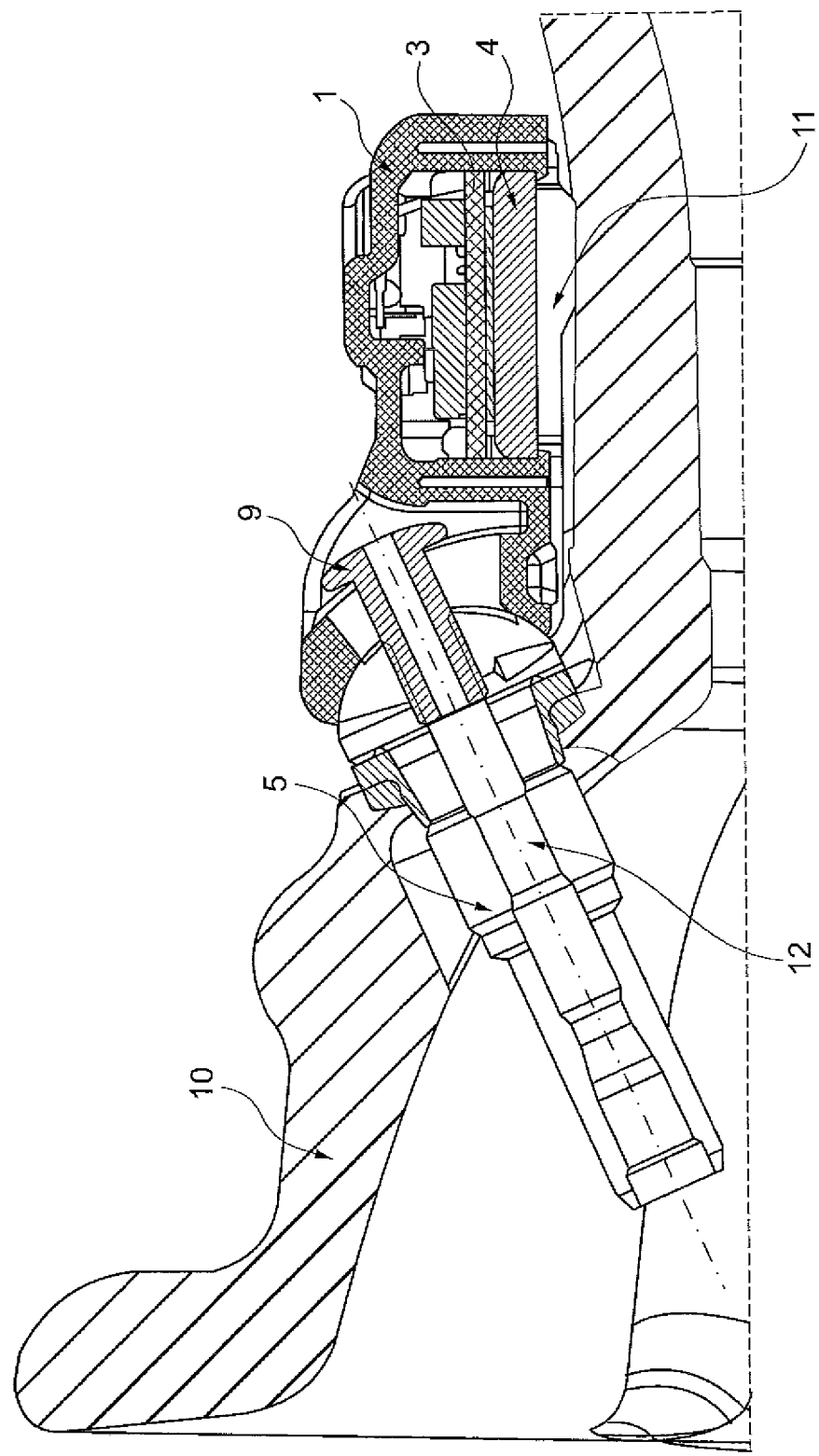
FIG. 3: is a sectional view of a further embodiment of a device for monitoring the tire pressure on a tire valve.

FIG. 3 shows a further embodiment of a device for monitoring the tire pressure. This embodiment essentially differs from the aforementioned embodiment only in the attachment to the tire valve 5. In this embodiment, the housing 1 comprises a cavern, which rests on a convexly shaped valve head. The valve housing is secured to the valve head by way of a hollow screw 9. The head of the hollow screw 9 is held in a slot configured in the housing 1. Before the screw 9 is tightened, the housing 1 can thus be pivoted along this slot on the valve head until it is seated on the rim well 10. For this purpose, the housing 1 may comprise protrusions 11 as foot elements that project downward on opposing longitudinal walls. These foot elements 11 are seated on the rim well 10 in the assembled state.

Although there has been hereinabove described a specific device for monitoring tire pressure in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

REFERENCE NUMERALS

1 Housing
2 Press-fit pins
2a Antenna
3 Printed circuit board
4 Spacer plate
5 Tire valve
6 Battery
7 Detent element
8 Securing element
9 Hollow screw
10 Rim well
11 Foot elements
12 Flow channel

What is claimed is:

1. A device for monitoring tire pressure, comprising:
an antenna for transmitting pressure data;
a printed circuit board, connected to the antenna, having a circuit for measuring and transmitting pressure data;
a power source for supplying the circuit; and
a housing surrounding the printed circuit board, said housing is produced by insert-molding the antenna.

2. The device according to claim 1, wherein the antenna comprises press-fit pins that protrude from a housing wall and are pressed into metallized holes of the printed circuit board, so that the antenna is connected by means of a pressing technique to the circuit carried by the printed circuit board.

3. A device according to claim 1, wherein the antenna is a magnetic antenna.

4. The device according to claim 3, wherein the magnetic antenna is formed by a metal bracket embedded in a housing wall.

5. A device according to claim 1, wherein the power source and the printed circuit board are disposed on top of one another in the housing.

6. A device according to claim 1, wherein a spacer plate is disposed between the power source and the printed circuit board.

7. A device according to claim 1, wherein the power source is disposed on the side of the printed circuit board which faces away from the antenna.

8. A device according to claim 1, wherein the housing comprises undercut detent elements, which grip the power source.

9. A device according to claim 1, wherein the printed circuit board is embedded into a potting compound.

10. A device according to claim 1 wherein the printed circuit board is embedded into a potting compound.

* * * * *